June 21, 1955　　　　　　F. L. MALTBY　　　　　　2,711,500
MEANS FOR ESTABLISHING THE PHASE OF AN ALTERNATING
CONTROL VOLTAGE AND A FOLLOW-UP
CONTROL SYSTEM EMBODYING THE SAME Filed Oct. 12, 1949　　　　　　　　　　　　　　2 Sheets-Sheet 1

INVENTOR.
Frederick L. Maltby
BY
E. C. Sanborn
Attorney

United States Patent Office 2,711,500
Patented June 21, 1955

2,711,500

MEANS FOR ESTABLISHING THE PHASE OF AN ALTERNATING CONTROL VOLTAGE AND A FOLLOW-UP CONTROL SYSTEM EMBODYING THE SAME

Frederick L. Maltby, Middlebury, Conn., assignor to The Bristol Company, Waterbury, Conn., a corporation of Connecticut Application October 12, 1949, Serial No. 120,893

5 Claims. (Cl. 318—29)

This invention relates to apparatus for establishing the phase of an alternating control voltage suited to the control of servomotors for balancing alternating-current networks, and more especially to the elimination of undesired phase components from potentials in selected branches of such networks, whereby to render such potentials suited to amplification for energization of the motor control windings. In the balancing of such networks, it is a common practice to utilize an alternating-current motor having two windings, one of which, commonly referred to as the "field" winding, is continuously energized from the same source as the network, and the other, commonly known as the "control" winding, is energized through a suitable amplifier from the branch of the network in which it is desired to reduce a selected component of the potential to a zero value. While, with such an arrangement, the tendency of the motor is to respond to that component of the potential applied to the control winding which bears a selected phase relation to the exciting potential impressed upon the field winding, and to be substantially unaffected by out-of-phase components, yet the presence of such components in the balancing circuit may result in unnecessary heating of the control winding, and overloading of the amplifier, with a consequent reduction in sensitivity of response.

It is an object of the present invention to provide a device having input and output terminals and adapted to have an alternating potential impressed upon its input terminals and to develop between its output terminals an alternating potential of fixed phase position with respect to an established reference alternating potential and of magnitude proportional only to that component of the input potential which is in phase with said reference potential, thereby eliminating useless and objectionable components from said output potential.

A further object is to provide means whereby from an alternating potential of a given phase position there may be selected and quantitatively utilized only that component which bears a predetermined phase relation to said potential.

Combining the above objects, it may be said that the purpose of the present invention is to provide means whereby an alternating potential of fixed frequency and indeterminate phase position may be converted to an alternating potential of the same frequency having a magnitude proportional to said first potential and to a function of its phase angle, and of fixed phase position.

In effecting the purposes of the invention, it is proposed to provide in combination a synchronous rectifier for converting an alternating current or potential to a proportional unidirectional magnitude, a suitable filter network for eliminating residual alternating components from the direct current, and an inverter element operated at the same frequency as that of the rectifier to recover an alternating current or potential of fixed, or controllable, phase position.

The present invention is not concerned with the old practice of converting direct current into alternating and reconverting the alternating current to direct. An example of such old practice, in measurement circuits, may be found in the "Secohmmeter," a device wherein direct current is rendered alternating by means of a commutator, utilized in a bridge circuit for the determining of reactive impedance values, and the unbalance potential applied through a separate commutator on the same shaft to a galvanometer, for the purpose of detection, whereby to effect a balance of the bridge network (see E. M. Terry: Advanced Laboratory Practice in Electricity & Magnetism: McGraw-Hill, 1922, page 151). The same method has been used in the measurement of resistance of electrolytes, where polarization of the electrodes renders direct-current measurements inadmissible. Examples of inversion of direct currents for amplification, and for transformation, respectively, and re-conversion into direct current, are found in U. S. Letters Patent No. 1,378,712, granted to J. W. Milnor May 17, 1921, and No. 1,635,002, granted to T. C. Lennox July 5, 1927. Conversion of the balance potential in a direct-current potentiometer network into alternating potential for amplification, and its reconversion into a unidirectional potential for operating a direct-current balancing motor, are disclosed in U. S. Letters Patent No. 2,150,006, granted to H. F. Parker et al. March 7, 1939.

While there is no intention of so restricting the scope of the present invention, it may be said that the type of circuit to which its principles are especially applicable is fully set forth and disclosed in U. S. Letters Patent No. 1,586,233, granted to H. Anschutz-Kaempfe May 25, 1926. In said patent, the output of a balanceable alternating-current network is impressed upon the input terminals of an amplifying unit, whose output is utilized in the control circuit of an alternating current motor of the two-phase class, having the other of its two circuits continuously energized from the same source as the network. As hereinbefore pointed out, the motor will be operatively responsive to a component of the current in the control circuit bearing a selected phase relation to that in the continuously energized circuit; and, while the motor will not recognize components having a phase other than that bearing a specific relation to the potential impressed upon the terminals of its continuously energized winding, yet such components in the associated network will tend to overload the amplifier, seriously reducing its sensitivity at an operating condition where such sensitivity should be maximum, and also to produce unnecessary heating in the motor winding and undesirable flux components in its magnetic system.

Figure 1:
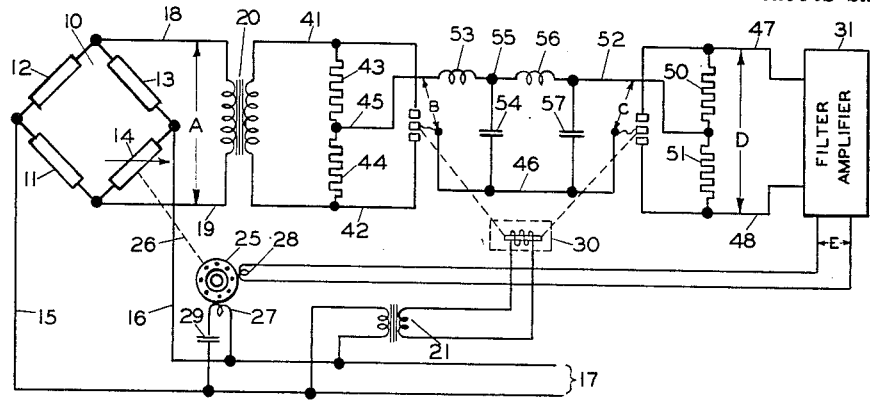
Fig. 1 is a diagram of an electrical measuring system embodying the principle of the invention.

Referring now to the drawings:

A balanceable network 10 is made up of four impedance members 11, 12, 13 and 14, connected in the order given, to form a closed loop. To two opposite junctions of the network 10 are connected conductors 15 and 16, representing the two sides of an alternating-current source 17. To the remaining two junctions of the network 10 are connected conductors 18 and 19, these in turn being connected to the primary terminals of an isolating transformer 20. While the elements 11, 12, 13 and 14 are indicated generally as being impedances, they may be inductors or capacitors, or resistors, or any desired combination thereof. One of said impedances (14) is provided with a movable part rendering it adjustable, whereby upon alternating potential being applied to the network between the conductors 15 and 16, adjustment may be made such as to reduce to zero the potential between the conductors 18 and 19, thus balancing the network. Furthermore, upon a disturbance of the balanced condition by change in the value of any of the other impedances, the impedance 14 may be further adjusted so as to restore the balanced condition. Thus, the physical position of the movable member by which the impedance 14 is adjusted will become a measure of the degree of unbalance introduced by variation in one of the other impedances, whereby, according to well known principles in the art of measurement, the network 10 may be adapted to the determination of values of a great variety of magnitudes.

Adjustment of the impedance 14 may conveniently be effected by means of a reversible electric motor 25, connected to the movable element of said impedance by means of suitable mechanical linkage 26. The motor 25 may expediently be of the alternating-current two-phase class, having two mutually displaced windings 27 and 28, of which the former is permanently connected across the terminals 15 and 16 and thereby to the alternating-current source 17. In order to obtain the optimum performance of the motor 25 it may be found desirable to energize the winding 27 in series with a capacitor 29, or other suitable phase shifting device, according to principles well known in the art of control. The winding 28 of the motor is adapted to energization from a source presently to be set forth.

Figure 2:
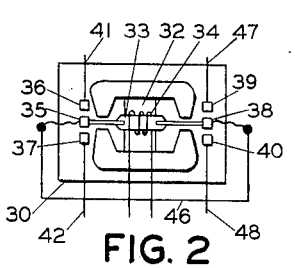
Fig. 2 is a representation to a somewhat enlarged scale of certain details of the apparatus set forth in Fig. 1.

Electrically interposed between the secondary winding of the transformer 20 and the winding 28 of the motor 25 are a synchronous contacting device 30 and a filter-amplifier 31. The contactor 30 may expediently be of the type fully set forth and disclosed in copending application Serial No. 103,869, filed July 9, 1949, by J. L. Russell, now Patent No. 2,636,094, April 21, 1953. For details of the contactor 30 reference may be had to Fig. 2 of the drawings. A permanent magnet member or equivalent 32 is fitted with pole pieces to provide two air-gaps in which are located the extremities of a ferromagnet armature 33 adapted to excitation by a winding 34. The armature 33 is provided at one of its extremities with a movable contact 35 adapted to engage alternatively two stationary contacts 36 and 37, and at the other of its extremities with a movable contact 38 adapted to engage alternatively two stationary contacts 39 and 40. The disposition of the magnetic structure, and the relative proportioning and positioning of other elements of the contactor 30 are made such that upon energization of the winding 34 from an alternating-current source, the magnetic fluxes so established, reacting with that from the permanent magnet 32 will cause the contacts 35 and 36 to partake of an oscillatory motion, synchronous with the potential of said source and having such mutual relationship that during one half-wave of the potential from said source the contacts 35 and 36 will be in engagement and at the same time the contacts 38 and 40 will be in engagement, and during the other half-wave of said other potential the contact 35 will engage the contact 37 while the contact 38 will engage the contact 39. Thus upon energization of the winding 34 from an alternating-current source, the contacting device 30 tends to function as a double-pole, double-throw, switch operating in synchronism with the potential of said source.

Contacts 36 and 37 of the contactor 30 are connected by means of conductors 41 and 42 respectively to the secondary terminals of the transformer 20. Between conductors 41 and 42 are connected in series two equal resistors 43 and 44, and to the common junction of said resistors is connected a conductor 45. From the contact 35 to the contact 38 is connected a conductor 46. The contacts 39 and 40 are connected respectively to conductors 47 and 48, and thereby to the input terminals of the amplifier 31. The output terminals of the amplifier 31 are directly connected to those of the motor winding 28. Between the conductors 47 and 48 are connected in series two equal resistors 50 and 51, and to the common junction of said resistors is connected a conductor 52.

Figure 3:
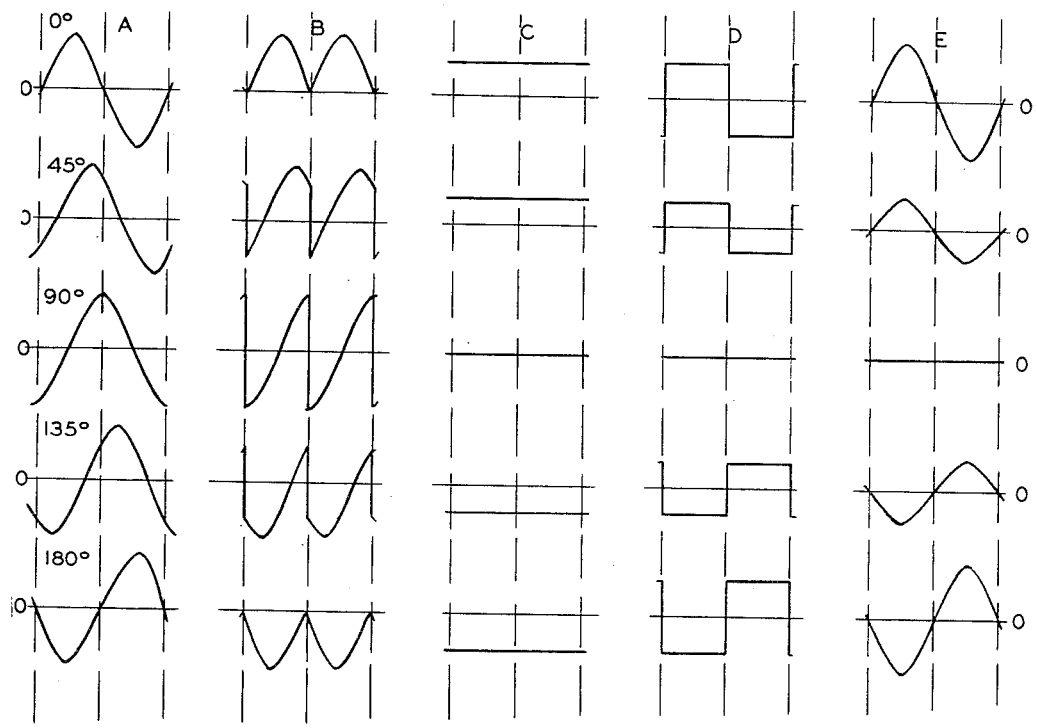
Fig. 3 is a graphic representation of certain electrical magnitudes associated with the operation of the apparatus shown in Fig. 1, bridge output signal A being shown as having constant amplitude for convenience.

Between the conductors 45 and 46 are connected in series an inductor 53 and a capacitor 54, having connected to their common junction point a conductor 55. Between the conductors 55 and 46 are connected in series an inductor 56 and a capacitor 57 having their common junction connected to the conductor 52. The relative proportioning of said inductors and capacitors is such that, with the arrangement set forth they will constitute a filter circuit, whereby a pulsating potential supplied between the conductors 45 and 46 will have its alternating component eliminated and will appear as a proportional constant potential between the conductors 52 and 46. The actuating winding 34 of the contactor 30 is connected through a suitable isolating and voltage coordinating transformer 21 to the conductors 15 and 16, thereby to be energized from the alternating-current source 17, causing the contacting system to be operated in synchronism with the measuring network 10. Should it be found desirable to modify the phase relationship between the contacting action and the potentials in the bridge system, the transformer 21 may be provided with suitable phase-shifting characteristics well known in the art of electrical measurement and control. With a view to clarifying the operation of the device as thus for set forth, the potentials existing in certain parts of the network may be designated by letters, as follows:

Output of bridge—A
Conductor 45 to conductor 46—B
Conductor 52 to conductor 46—C
Conductor 47 to conductor 48—D
Output of amplifier 32—E In Fig. 3 are shown the typical wave forms of the several potentials corresponding to different phase positions of the bridge output, relative to a fixed phase of operation of the synchronous contacting device 30, the potentials being indicated as for each 45° position in complete reversal from 0° to 180° phase shift. Thus, the input may be considered as comprising a constant alternating potential of varying phase position. It will be understood that the potential existing between the conductors 41 and 42 and applied across the series combination of resistors 43 and 44 will be substantially identical in wave-form and phase position with the output A of the bridge network. In the interest of simplicity in the graphic representation, the transformer 20 is taken as having a ratio to provide a secondary voltage double the value of the primary voltage. Thus, the amplitude of potential appearing across either of the series resistors 43 and 44 will be equal to that of the bridge output.

Considering now the potentials at the several selecting points in the network, the potential A is first shown as being in phase with the operation of the contactor 30 whereby the potential B will be the voltage between the junction point of the equal resistors 43 and 44 and the moving contact 35, which, in its synchronous action alternately attains the potentials of the conductors 41 and 42 respectively. Thus, the potential B represents in wave form the potential A as fully rectified.

The potential B, impressed upon the filter network comprised of the inductors 53 and 56 and the capacitors 54 and 57 has its alternating component thereby eliminated with a resultant potential C which is unidirectional and of constant value. Action of the oscillating contact 38 in its alternate engagement with contacts 39 and 40 is to impress the potential of the conductor 46 alternately upon the conductors 47 and 48, while the junction point of the resistors 50 and 51 is maintained at the potential of the conductor 52. The potential between the conductors 47 and 48, as indicated at D thus becomes an inverted voltage, or an alternating potential characterized by a "square" wave.

The filter-amplifier combination 31 receives the potential D and passes only the fundamental frequency, whereby there appears at the output terminals of said amplifier a potential E, which is of sinusoidal form, and adapted to be impressed upon the winding 28 and the motor 25. The potential impressed upon the winding 27 of the motor 25 being permanently shifted from the line potential derived from the source 17 in a manner to give optimum operating condition in said motor, the voltage applied to the motor windings will coact in a manner well known to the art to produce in said motor a torque dependent in intensity and direction upon the magnitudes and relative phase position of said applied potentials.

Consideration may now be given to conditions developing when the output potential of the bridge network is shifted in phase without any alteration in its magnitude. It may first be assumed that this potential has lagged its original position by an angle of 45°. As shown in the diagram, the voltage wave at A has not changed in any of its proportions or dimensions, but has moved along the time axis by an amount corresponding to an angle of 45 electrical degrees. Since there is no change in the phase position of the contacting operation, the rectifying contacts will operate as before, but will perform their reversal function at an instant in each wave which does not correspond with the transition of the potential through its zero value. Consequently, the rectified potential will contain both negative and positive components; and the net effective voltage will be the algebraic sum of these, and will be less than the value obtained with commutation taking place at an instant corresponding to the zero value. The output of the filter network, represented by the potential C will then have a lesser value than that corresponding to complete rectification. It follows that when the decreased value of the potential C is applied to the inverting contacts of the device 31, the amplitude of the "square" wave appearing at D will be less than the original value. This, when passed through the filter circuit, will give a potential E having a substantially sine wave but of correspondingly lower amplitude and effective value than in the original case. This potential impressed upon the winding 28 of the motor 25, and coacting with the influence of the winding 27, will produce torque in the same direction as before, but of lesser intensity. While it will be apparent that a shifted potential derived from the bridge circuit, and corresponding to the wave A, if applied to the motor winding 28 would similarly have resulted in a torque of less magnitude than that produced by the potential having a zero phase shift, it will be seen that the idle, or inactive, components of this potential have been eliminated by the improved apparatus thereby relieving objectionable loading on the filter circuit, and also reducing the magnitude of current flowing in the motor winding.

Consideration may now be given to conditions existing when the phase of the potential A has been shifted 90 electrical degrees from its original position, the presence of such a potential in the absence of any other component representing a condition of balance so far as concerns the potential applied to the network. With rectification taking place as before, the switching action of the rectifying contacts will now take place at the peak of each wave, with the result that the negative and the positive components of the rectified potential are equal in value. Thus, after the filter network has eliminated the alternated component, there is no residual potential, and the direct-current value of the potential C is zero as seen in the diagram. Thus, output of the inverter contacts and of the amplifier will have a zero value, and no torque will be developed by the motor 25.

In a similar manner, a further shift of the potential in a lagging sense will give rise to a resultant amplified potential opposite in sense to the original voltage and increasing in magnitude as the phase shift is carried through its successive values, of which 135° and 180° are graphically illustrated. It will thus be seen that by utilization of the principles of the invention an alternating potential of constant value and progressively varying phase position may be converted into an alternating potential of fixed phase position and progressively varying magnitude, with the advantages as hereinbefore set forth. It will be clear, also, that a change in amplitude of the original potential A will be reflected in a proportional change in amplitude of the output potential E. It will be apparent that the reversal (or 180 degrees phase-shift) of potential E, corresponding to displacements of more than 90° in the potential A, will result in reversal of rotation of the motor 25, and in an operating torque corresponding to the amplitude of the recovered voltage. It will also be seen that, with the inductors 53 and 56 and the capacitors 54 and 57 so selected as to filter all alternating components from the portion of the network in which they are connected, such un-rectified residuals in the potential B as may be due to harmonics in the potential A will be eliminated from the output potential. It will be clear, moreover, that, should it be desired to utilize a voltage component having a phase relation to the supply voltage differing from the "in-phase" relation set forth, the transformer 21 may be provided with predetermined phase-shifting characteristics by methods well known in the art, and the desired phase selection incorporated in the output.

Figure 4:
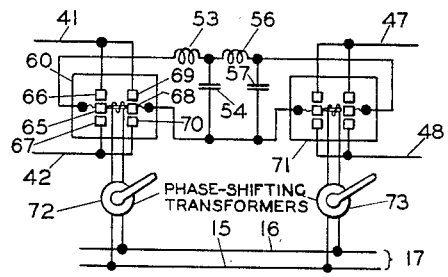
Fig. 4 is a diagram of an alternative application of the principles of the invention.

In Fig. 4 is shown the manner in which two synchronous contacting devices may be combined to increase the efficiency and flexibility of the apparatus, the modification consisting in the substantial equivalent of replacing the voltage-dividing resistor combinations 43—44 and 50—51 of Fig. 1 by synchronous switching means. A contacting device 60, mechanically equivalent to the hereinbefore described synchronous contactor 30, is provided with two sets of contacts as follows: A movable contact 65 is adapted to engage alternatively two stationary contacts 66 and 67; and a movable contact 68 is adapted to engage alternatively two stationary contacts 69 and 70. The action of the movable contacts is made such that as contact 65 engages the contact 66 the contact 68 engages the contact 70; and as the contacts 65 and 67 are brought into engagement the contacts 68 and 69 are also brought into engagement. The contacts 66 and 69 are both connected to the conductor 41, and the contacts 67 and 70 to the conductor 42. The contacts 65 and 68 are connected respectively to the conductors 45 and 46, whereby such potential as may appear between said contacts will be impressed upon the filter network comprised of the inductors 53 and 56 and the capacitors 54 and 57. It will thus be seen that the synchronous contacting device 60 will function as a reversing switch or commutator serving to rectify the potential A and impress it upon the input terminals of the filter network. For this reason, each pulse impressed upon the filter will repersent the full voltage between the conductors 41 and 42 instead of half said voltage as in the embodiment of the invention shown in Fig. 1; and at the same time the voltage drop due to the resistance of the units 43 and 44 in Fig. 1 will be eliminated.

A further synchronous contactor 71, identical in all respects with the contactor 60 is connected in such a manner that the output of the filter network is applied between its movable contacts, while its respective stationary contacts are interconnected in such a manner that the inverted potential derived therefrom will be applied directly to the conductors 47 and 48. Thus the contactor 71 will operate to impress upon the conductors 47 and 48 the output potential of the filter network, inverted with the same degree of improved efficiency as characterizes the performance of the contactor 60, in impressing the rectified potential upon said filter. The synchronous contactors 60 and 71 receive their operating current from the source 17 through the medium of two phase-shifting transformers 72 and 73, whereby the phase of operation of said contactors may be adjusted either simultaneously or independently as may be expedient.

Figure 5:
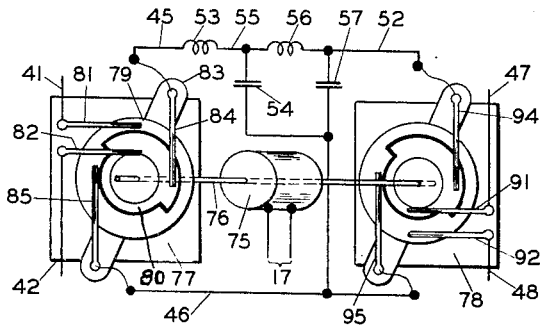
Fig. 5 illustrates a further alternative by which the principles of the invention may be carried out.

In the form of the invention shown in Fig. 5, the synchronously vibrating contactors of the previous embodiments are replaced by conventional two-segment rotating commutators driven in synchronism with the voltage of the system. A synchronous motor 75 drives a rotating shaft 76 upon which are mounted two similar commutators 77 and 78. Comprising the commutator 77 is a conducting member 79 including a circular portion and a semicircular portion each adapted to provide a bearing surface for a stationary brush, and a further conducting member 80 also having a circular portion and a semicircular portion each adapted to provide a bearing surface for a brush. The conducting members 79 and 80 are insulatedly mounted upon the shaft 76 for rotation therewith. Stationary brushes 81 and 82 are arranged to bear on the circular portions of the members 79 and 80 respectively, and are connected to the conductors 18 and 19 of the measuring network, thus providing continuous electrical connection between said conductors and said conducting members.

Insulatedly carried upon a bracket 83 adapted for angular adjustment about the shaft 76 are two brushes 84 and 85, oppositely disposed, and connected respectively to the conductors 45 and 46. Said brushes 84 and 85 engage alternately the respective semicircular portions of the conducting members 79 and 80 during rotation of the commutator assembly. In short, said conducting members 79 and 80 of the commutator are so mounted with respect to the various brushes that, while the circular portions of said conducting members provide continuous collector rings for engagement by the cooperating brushes 81 and 82, the semi-circular portions of said conducting members are alternated on a common circle, so that in each revolution of the commutator, each of the brushes 84 and 85 will have alternate conductive engagement with said semi-circular portions, and each of said brushes 84 and 85 will thus be alternately electrically connected to the conductors 18 and 19 in each revolution of said commutator.

The commutator 78 is similar in all respects to the commutator 77, having a pair of stationary brushes 91 and 92 and an angularly adjustable bracket carrying oppositely disposed brushes 94 and 95 so coordinated with the moving and mutually insulated conducting portions of the commutator that the latter pair of brushes is alternately and reversibly connected to the former pair of brushes in the manner identical to the commutator 77. Between the movable brushes of the commutator 77 and those of the commutator 78 is connected the hereinbefore described filter circuit of Fig. 1; and the brushes 91 and 92 are connected to the conductors 47 and 48.

It will be seen that with the motor 75 being energized from the source 17 and thus operated in synchronism with the measuring circuit as shown in Fig. 1, the performance of the two commutators and associated brushes will be substantially equivalent to that of the double vibrator shown in Fig. 4, so that, with proper phasing of said commutators with respect to each other, and to the voltage of the source 17, the potential appearing between the conductors 47 and 48 will be of fixed phase position and of a magnitude dependent upon the phase position of the potential between the conductors 18 and 19 with respect to that of the source 17. The phase of effective operation of said commutators may be adjusted either in unison or independently, by suitably positioning the adjustable brackets 83 and 93, upon which the respective brush assemblies are carried.

While the several embodiments of the invention have been set forth as each involving similar switching means on the input and the output sides of the filter network respectively, it will be obvious to those versed in the art that there is no necessity for rigidly adhering to such combinations. For example the complete commutating device 60 shown in Fig. 4 could be made to replace the switching elements 35, 36 and 37 shown in Fig. 1, with concomitant elimination of resistors 43 and 44, and with the switching elements 38, 39 and 40 retained in the form as shown. A reversal of this combination would also be effective in its operation. Similarly, a rotating commutator could be used on one side of the filter circuit and either form of the vibrating commutator or synchronous switching device effectively utilized on the other side. Any of these combinations, or other, and similar, combinations which will readily suggest themselves to those versed in the art may be effectively employed without departing from the spirit of the invention.

In the absence of a more explicit generic term, expressions such as "of fixed phase position" or "of fixed phase relation," as used herein and in the appended claims, may be taken as descriptive of an alternating current or potential devoid of progressive shift along its time axis, attaining its zero values and its peak values at substantially unchanged intervals in a reference time cycle, and the polarity of whose alternate pulses may vary between negative and positive, corresponding to a phase shift of 180 degrees (as illustrated in connection with potentials E in Fig. 3).

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for deriving, from an alternating potential of indeterminate phase relation to a reference potential source, an alternating potential of fixed phase relation to said source and of amplitude variable with said indeterminate phase relation, comprising, in combination, a pair of conductors subject to said first potential, a pair of equal resistors connected in series between said conductors and having an intermediate tap, a double-throw switching apparatus having contact members connected respectively to said conductors and an intermediate contact adapted alternatively to engage said contact members, a second pair of conductors, a pair of equal resistors connected in series between the same and having an intermediate tap, a second double-throw switching apparatus having contact members connected respectively to said last-named conductors and an intermediate contact adapted alternately to engage said contact members, a network connecting said first tap and intermediate contact to said second tap and intermediate contact and including filter means adapted to eliminate alternating potential components in said network, and connections for operating said intermediate contacts in synchronism with said source and in fixed phase relation thereto, whereby to impress between said last named conductors an alternating potential having a fixed phase relation to said source.

2. In combination, an alternating current motor having a field winding adapted for energization from an alternating potential and a control winding adapted for energization from another alternating potential having the same frequencies as said first-named potential, mechanical means comprising relatively movable solid contacts engageable with and disengageable from each other at regularly recurrent time intervals for rectifying the said other alternating potential, a filter system for eliminating the alternating component from the output of said rectifying means to produce a substantially constant unidirectional potential, mechanical inverter means comprising relatively movable solid contacts engageable with and disengageable from each other at regularly recurrent time intervals for producing from said constant potential a third alternating potential, having a fixed phase relation to the first mentioned alternating potential, connections for the operation of said rectifying means and said inverter in fixed phase relation to said first mentioned potential, and connections for applying said third alternating potential to the control winding of said motor.

3. In combination, an alternating current motor having a field winding adapted for energization from an alternating potential and a control winding adapted for energization from another alternating potential having the same frequencies as said first-named potential, mechanical means comprising relatively movable solid contacts engageable with and disengageable from each other at regularly recurrent time intervals for rectifying the said other alternating potential, a filter system for eliminating the alternating component from the output of said rectifying means to produce a substantially constant unidirectional potential, mechanical inverter means comprising relatively movable solid contacts engageable with and disengageable from each other at regularly recurrent time intervals for producing from said constant potential a third alternating potential, having a fixed phase relation to the first mentioned alternating potential, connections for the operation of said rectifying means and said inverter in fixed phase relation to said first mentioned potential, filter means for converting said third alternating potential to a substantially sinusoidal form, and connections for applying said third alternating potential to the control winding of said motor.

4. In combination, a balanceable alternating-current measuring network comprising interconnected impedances at least one of which is adjustable to effect the balance condition of said network, said network having input terminals adapted for connection to an alternating-current source of supply and output terminals adapted to have developed therebetween a potential proportional in amplitude and in phase position to the degree and the sense, respectively, of the unbalance of said network, phase discriminating means comprising a polarity reversing member connected to said output terminals and operable in synchronism and in fixed phase relation with said source of supply to produce from said output potential a rectified potential having a unidirectional component, a filter network connected to said polarity-reversing member substantially to eliminate alternating components from said rectified potential, a further polarity-reversing member coupled to said first polarity-reversing member for operation in synchronism and in fixed phase relation therewith and connected to said filter network to convert the output thereof into an alternating potential having a predetermined and fixed phase relation to said source of supply.

5. In combination, a balanceable alternating-current measuring network comprising interconnected impedances at least one of which is adjustable to effect the balance condition of said network, said network having input terminals adapted for connection to an alternating-current source of supply and output terminals adapted to have developed therebetween a potential proportional in amplitude and in phase position to the degree and sense, respectively, of unbalance of said network, motor means for adjusting said adjustable impedance and comprising two windings and operable in accordance with the relationship of alternating potentials impressed upon said respective windings and having one of said windings connected for permanent energization by a potential bearing a predetermined and fixed phase relation to said source of supply, phase discriminating means comprising a polarity-reversing member connected to said output terminals and operable in synchronism and in fixed phase relation with said source of supply to produce from said output potential a rectified potential having a unidirectional component, a filter network connected to said polarity-reversing member substantially to eliminate alternating components from said rectified potential, a further polarity-reversing member coupled to said first polarity-reversing member for operation in synchronism and in fixed phase relation therewith and connected to said filter network to convert the output thereof into a second alternating potential having a predetermined and fixed phase relation to said source of supply, and circuit means for impressing upon the other of said motor windings a potential corresponding to said last-named alternating potential.

References Cited in the file of this patent

UNITED STATES PATENTS

| | | |
|---|---|---|
| 1,990,759 | Stone | Feb. 12, 1935 |
| 2,201,873 | Verse | May 21, 1940 |
| 2,232,010 | Musser | Feb. 18, 1941 |
| 2,409,970 | Agins | Oct. 22, 1946 |
| 2,465,110 | Mead | Mar. 22, 1949 |
| 2,466,035 | McCoy | Apr. 5, 1949 |
| 2,479,105 | Emerson | Aug. 16, 1949 |
| 2,481,562 | Bailey | Sept. 13, 1949 |
| 2,484,134 | Wald | Oct. 11, 1949 |
| 2,494,499 | Wilhelm | Jan. 10, 1950 |
| 2,503,739 | Janssen | Apr. 11, 1950 |
| 2,537,767 | Langwalter | Jan. 9, 1951 |
| 2,591,952 | Lucas | Apr. 8, 1952 |